3,087,964
VAPOR PHASE OXIDATION OF ACROLEIN TO ACRYLIC ACID
Theodore Augur Koch, Glen Mills, Pa., and Ivan Maxwell Robinson and William Lee Wiley, Wilmington, Del., assignors to E. I. du Pont de Nemours and Company, Wilmington, Del., a corporation of Delaware
No Drawing. Filed May 25, 1959, Ser. No. 815,320
3 Claims. (Cl. 260—530)

This invention relates to the vapor phase oxidation of unsaturated aldehydes to the corresponding alkenoic acids. More particularly, it relates to the manufacture of acrylic acid from acrolein.

In the past, oxidation of acrolein to acrylic acid has been carried out in the liquid phase using as a catalyst either a specially prepared vanadic acid or a heavy metal salt of a fatty acid. It has also been known that certain catalysts, such as cobalt boromolybdate and related molybdates, are effective in the vapor phase oxidation of butane to maleic anhydride. In accord with the present invention acrolein in the vapor phase can be converted to acrylic acid in good yields by contacting acrolein in the presence of oxygen with a catalyst such as cobalt boromolybdate or related molybdates at an elevated temperature. In the preferred mode of executing the process of this invention, the reaction is carried out in the presence of one or more inert diluents, such as nitrogen, water, etc.

The catalysts employed in the practice of this invention comprise molybdenum oxide combined with a basic metal oxide, preferably with cobalt or nickel oxide. Although good results are obtained from two-component catalysts, it is generally preferable to include a third compound, namely an acidic oxide, in the catalyst, i.e. to use a modified cobalt or nickel molybdate, such as the boromolybdate or phosphymolybdate.

The oxidation is generally carried out by feeding an aqueous solution of acrolein or an acrolein-nitrogen mixture to the catalyst system. The concentration of acrolein in the feed may be from 0.5 to 95 mol percent while the molar ratio of oxygen to acrolein may range from about 30:1 to about 0.05:1. Any gas containing molecular oxygen, e.g. air, oxygen, or mixtures thereof, may be used as the oxidant. When the acrolein-water mixture is used as the feed, this aqueous solution can be preheated to temperatures up to about 400° C. prior to mixing with oxygen or air. After passing through a second preheat zone, the mixture is then fed to either a fixed bed or a fluidized bed reactor containing the active catalysts. When the acrolein-nitrogen mixture is employed, the nitrogen stream can be sprayed through pure acrolein or otherwise mixed with the acrolein stream. After mixing with oxygen or air the reactants pass through a preheat zone and over the active catalyst in the fixed bed or fluid bed reactor.

The reaction zone is maintained at a temperature between 250° C. and 500° C. Preferably, the temperature should be kept at about 350° C. to about 425° C. Above 425° C. the oxidation to oxides of carbon is excessive. The pressure at which the reaction is conducted is not critical, and pressures of about 1 atmosphere are preferred but higher pressures are also operable.

The product stream contains acrylic acid, acetic acid, acetaldehyde, carbon oxides, water, and minor amounts of other oxygenated materials in addition to unreacted starting materials. The condensables can be removed by cooling or absorption.

The metal oxide-molybdenum oxide catalyst used in this oxidation of unsaturated aldehydes to alkenoic acids varies in composition, the ratio of base metal to molybdenum being 1:1 or less. The atomic ratio of the basic metal to molybdenum is practically limited to at least 0.3:1 due to difficulties in preparation, and it is preferred that the ratio be between 1:1 and 0.5:1. In any event, this ratio must be 1:1 or less and greater than 0.1:1 even if a practical means of preparing the catalyst with a ratio of basic metal to molybdenum of more than 1.1:1 were available. Further, the proportion of acidic promoter should be between 0.1% and 15%, calculated as metal and not as the oxide, by total weight of the whole catalyst. The catalyst can be obtained by fusing a mixture of the desired oxides. No reduction is required. Activation occurs during fusion in air at about 400° to 600° C.

In a preferred embodiment of the invention the catalyst is a precipitated oxide catalyst consisting essentially of molybdenum oxide combined with an oxide of cobalt, the atomic ratio of cobalt to molybdenum being between 1:1 and 0.3:1. Catalysts of this nature can also be combined with an oxide of boron or an oxide of phosphorous with the relative quantities of these, calculated as boron or phosphorous, being between 0.1% and 5%, by weight of the catalyst.

The catalysts of the present invention are generally prepared by precipitating molybdenum in the form of a molybdate from an aqueous molybdate solution, by adding a salt of a metal from the group consisting of cobalt and nickel, the atomic ratio of the basic metal to molybdenum in the precipitate being less than 1:1, filtering, drying at an elevated temperature, and thereafter adjusting the physical form of the precipitated catalyst as desired.

In a more specific form the catalysts employed in the practice of the present invention are prepared by precipitating molybdenum in the form of a molybdate with a metal by adding a salt of said metal from the group consisting of cobalt and nickel, precipitation being carried out in an aqueous medium in the presence of an acidic promoter in the form of an acid from the group consisting of the acids of boron, phosphorous, and vanadium, the atomic ratio of the said metal to molybdenum in the precipitate being less than 1:1, filtering, drying at an elevated temperature, followed by further heating at a more elevated temperature, and thereafter adjusting the particle size of the precipitated catalyst as desired.

In a preferred and still more specific form a particular catalyst for use in the present invention is prepared by precipitating molybdenum in the form of a molybdate with cobalt in the form of a cobalt salt, precipitation being carried out in an acidic aqueous medium in the presence of boric acid, the ratio of cobalt to molybdenum in the precipitate being less than 1:1, and the boron content of the precipitate being between 0.1% and 5% by weight of the total catalyst, filtering, drying at an elevated temperature, and thereafter adjusting the particle size of the precipitated catalyst as desired.

It is to be understood that the catalysts of the present invention are not definite chemical compounds but that all of them, upon analysis, are characterized by having the atomic ratio of the basic metal to molybdenum less than 1:1. Molybdenum combined in some manner with oxygen is the essential component of the type of catalyst embodied herein, and it is in this sense of the word that the term "molybdenum oxide" is used to designate the form in which molybdenum is present in the subject catalysts. Since the chemistry of molybdenum-oxygen compounds is very complex, much of it is still subject to some debate and speculation. In the instance of these catalysts molybdenum probably occurs in the anion as a molybdate, an isopolymolybdate, or a heteropolymolybdate together with some other acidic constituent such as boron, phosphorus, or vanadium. In referring to the present catalysts as comprising molybdenum oxide combined with a basic metal oxide from the group consisting of the oxides of cobalt and nickel, the general formula RO·nMoO₃ may be used to illustrate that which is meant by the term "oxide" as used herein in which R represents cobalt or nickel. Depending upon the conditions under which the catalyst is prepared, $n$ may vary from a value greater than 1 to 16 inclusive, it being understood that the atomic ratio of basic metal to molybdenum is to be less than 1:1. Furthermore, it is within the scope of this invention to include catalysts in which the value of $n$ is predominantly 2, 3, or 4 etc., or catalysts which may be composed of a mixture of oxides of the general formula RO·nMoO₃ in which the value for $n$ varies for each particular oxide.

Precipitation of the catalyst can be carried out in the presence of heterogeneous catalyst supports, such as silica, alumina, silicon carbide, quartz, and other inert supports or supports capable of chemisorption. The catalyst can also be prepared by impregnation of a support followed by precipitation in situ.

Regardless of the particular structure of the type of catalysts embodied herein, molybdenum combined in some manner with oxygen is the essential component thereof, the function of the molybdenum being to act as the center of oxidation and to promote attack on the material being oxidized.

As briefly discussed hereinbefore, molybdenum alone is not sufficient for the oxidation of the organic compounds, but it is combined in these catalysts with a basic metal oxide from the group consisting of the oxides of cobalt and nickel. The preparation of a satisfactory catalyst may vary widely, but it is necessary that the catalyst be formed in such a manner that the atomic ratio of the basic metal to molybdenum be less than 1:1; broadly, any procedure may be used that will give a precipitated oxide catalyst of the composition hereinbefore set forth. Among the factors that tend to affect the composition of the precipitate and, hence, the combined oxides obtained therefrom, are the chemical nature of the precipitating ions, the pH of the solution, the temperature of the precipitation, the rate of precipitation, the exact method of precipitation, the sequence of addition of precipitating solutions, absolute concentration of the precipitating ions, the relative concentration of the precipitating ions, the filtering and washing techniques, and the methods of drying and heat treatment. These factors may also affect the structure of the combined oxides and, to some degree, even the activity of the catalyst. While precipitation from aqueous medium is ordinarily the most economical and practical, an organic liquid medium may be used. Other methods of preparation, apparent to those versed in the art, can also be employed so long as the catalyst conforms to the specific combination of constituents as set forth.

Although satisfactory catalysts can be made from molybdenum oxide plus a basic metal oxide, it is beneficial to incorporate an acidic promoter with these catalyst compositions, the acidic promoter being preferably selected from the group consisting of the oxides of boron, phosphorous, and vanadium. Included among other promoters which may be used are silicon, tungsten, titanium, beryllium, zirconium, chromium, and uranium. These promoters are added to the precipitating medium and, subsequent to heating the catalyst at an elevated temperature, the promoters will be present in the catalyst in the form of oxides. From about 1.1% to 15% of boron, phosphorous or vanadium, by weight of the total catalysts, should be present in the catalyst. It is to be understood that these promoters act in different ways and, depending upon the particular acidic promoter employed, addition thereof to the catalyst composition may tend to increase the activity of the catalyst, improve the selectivity of the catalyst with respect to the oxidation of particular organic compounds, control the physical structure of the catalyst or help control the ratio of basic metal to molybdenum in the process of precipitation of the catalyst.

After precipitation of the catalyst in accordance with the procedure illustrated in the foregoing examples, the catalyst is filtered hot and dried in an oven about 100° C. Thereafter, the catalyst is maintained at temperature in the range between about 400° C. to 500° C. in a slow stream of air for at least 3 to 4 hours. Depending upon the type of reactor used, that is, a static bed or a fluid bed of catalyst, the precipitated catalyst is ground to the desired size. The catalyst may be as coarse as 1 to 2 mesh, although the usual range is from 4–100 mesh. Larger particle sizes are used in static bed reactors whereas, the fluid bed reactors require smaller particle size.

*Example 1*

A mixture of acrolein, oxygen, and nitrogen comprising 19 mol percent acrolein, 10 mol percent oxygen and the remainder nitrogen is passed over a cobalt boromolybdate catalyst prepared as above described and composed of cobalt, boron, and molybdenum oxides in the mol proportion of 1:0.01:1 (Co:B:Mo). The above mixture is passed over a bed of this catalyst having a bulk volume of 20 cc. at a rate such that .04 mol per minute of acrolein is introduced into the reaction zone which is maintained at 375° C. A total running time of 60 minutes is used. The products are removed by passing the effluent gases through ice cooled scrubbing towers containing water. The conversion level of 41 percent gives a 49 percent yield of acrylic acid, and about 2 percent of acetic is obtained.

*Example 2*

A mixture of acrolein, air, and water comprising 4 mol percent acrolein, 53 mol percent air, and the remainder water is passed over a cobalt boromolybdate catalyst at a temperature of 380° C. and a pressure of 1 atm. at a rate of .02 mol of acrolein/minute. The contact time of acrolein with the catalyst is 0.35 second, and the total running time is 60 minutes. The conversion of acrolein is 37 percent from which are obtained yields of 60 percent acrylic acid and 9 percent acetic acid.

*Example 3*

Where oxygen is substituted for air so that the feed mixture is comprised of 69 mol percent oxygen, 4 mol percent acrolein, and the remainder water at about the same temperature and contact time as in Example 2, yields of 47 percent acrylic acid, 11 percent acetic acid, and 6 percent acetaldehyde are obtained at a conversion level of acrolein of 45 percent.

*Example 4*

Example 1 is repeated, using a catalyst from which the boric acid promoter has been omitted. The reduction in yield is slight.

*Example 5*

Example 1 is repeated using cobalt phosphomolybdate with results similar to those obtained using cobalt boromolybdate.

*Example 6*

Example 1 is repeated using a nickel molybdate catalyst either alone or promoted with phosphoric or boric anhydride. Essentially the same results are obtained.

*Example 7*

Example 1 is repeated using a cobalt or nickel vandyl molybdate catalyst. Similar results are obtained.

In all of the above examples the total acid was determined by titration and the concentrations of acrylic acid, acetic acid, acrolein, and acetaldehyde in the condensed phase of the effluent as well as in the traps were measured by gas chromatography.

It is apparent from the foregoing discussion and illustrative examples that many modifications of the present invention may be accomplished by those skilled in the art without departing from the spirit or scope of the invention. This application for Letters Patent is intended to cover all such modifications as would fall in the scope of the appended claims.

This application is a continuation-in-part of our application Serial No. 782,661, now Patent 3,065,264, filed December 24, 1958.

We claim:

1. Process for manufacturing acrylic acid from acrolein which comprises bringing acrolein in the vapor phase at a temperature of from 250° C. to 500° C. in the presence of oxygen into contact with a catalyst consisting of molybdic oxide combined with a metal oxide from the group consisting of the oxides of cobalt and nickel, the atomic ratio of base metal to molybdenum being from 1:1 to 0.5:1 and thereafter separating acrylic acid from the effluent gases.

2. Process of claim 1 wherein the said acrolein is diluted with an inert diluent.

3. Process of claim 1 wherein the catalyst contains a promoter of the class consisting of the oxides of boron, phosphorous and vanadium.

References Cited in the file of this patent

UNITED STATES PATENTS

| | | |
|---|---|---|
| 2,398,867 | Staudinger et al. | Apr. 23, 1946 |
| 2,881,213 | Idol et al. | Apr. 7, 1959 |